2,802,833
DIPHTHALIDES

Donald D. Wheeler and David C. Young, Midland, Mich., assignors to The Dow Chemical Company, Midland, Mich., a corporation of Delaware No Drawing. Application April 30, 1956, Serial No. 581,348

8 Claims. (Cl. 260—343.3)

This invention is concerned with diphthalides having the formula

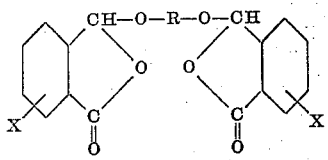

In this and succeeding formulae, R represents a member of the group consisting of methylene and an alkylene radical containing from 2 to 8 carbon atoms, inclusive; and X is a member of the group consisting of hydrogen and chlorine. This invention further includes a method for preparing these compounds.

The expression "alkylene" as herein employed refers to "any bivalent aliphatic radical having two free valences attached to different carbon atoms" and is inclusive of such structures as

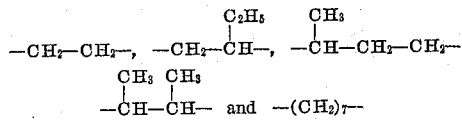

These new compounds are amber colored oils or light colored solids of very low solubility in water. Most of these compounds are somewhat soluble in many organic solvents such as benzene, toluene and acetone. They have utility as microbicides and are adapted to be employed for the control of bacterial organisms. These diphthalides may be prepared by heating together a phthalaldehydic acid having the formula

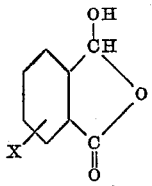

and an appropriate dihydroxy compound having the formula

HO—R—OH to produce the desired diphthalide and water of reaction. The terms "phthalaldehydic acid" and "3-hydroxyphthalide" refer to a compound having the structure

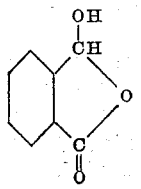

Phthalaldehydic acid is often represented in the literature as having the structure

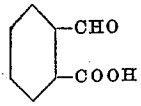

However, the acid employed in this invention and prepared as hereinafter described exists almost entirely in the closed ring 3-hydroxyphthalide structure as observed from a study of its infrared absorption spectrum. Infrared data also indicate the diphthalide product to have a closed ring 3-hydroxyphthalide structure with the open chain ester sometimes being formed as a by-product. In the above reaction, formaldehyde appears to function as a dihydroxymethylene compound and is employed to prepare the diphthalide product where R is methylene.

In the synthesis, good results are obtained when substantially two molar proportions of phthalaldehydic acid are employed for each molar proportion of the dihydroxy compound. The relative amounts of the reactants are not critical in the formation of the desired product. However, phthalaldehydic acid, if used in large excess, may form an anhydride by-product. The reaction takes place smoothly in the temperature range of from 90° to 225° C. at a pressure of from 15 millimeters to 760 millimeters. The product obtained may be separated from the water of reaction by vaporization of the latter.

In a preferred method of carrying out the reaction, phthalaldehydic acid and the dihydroxy compound are mixed and heated at the desired temperature and at atmospheric pressure for from 0.5 to 3 hours. After an initial heating period at atmospheric pressure, the system is evacuated to a pressure of about 15 millimeters and the temperature gradually raised to distill the water of reaction and low boiling material and leave the desired diphthalide product as a residue. The latter usually solidifies on cooling and may be further purified by washing and/or recrystallization procedures.

In an alternative procedure, the reactants are mixed and heated at the desired temperature and pressure for from 1 to 7 hours. After completion of the reaction, the mixture is cooled and poured into water to precipitate the phthalide product. The latter is washed with water and then dissolved in benzene. The benzene solution is heated to distill (1) the water, as a benzene-water azeotrope, (2) the benzene solvent and (3) any low boiling material, to recover a purified product.

The following examples illustrate the invention but are not to be construed as limiting.

*Example 1.—3,3'-(1,2-dimethylethylenedioxy)-diphthalide*

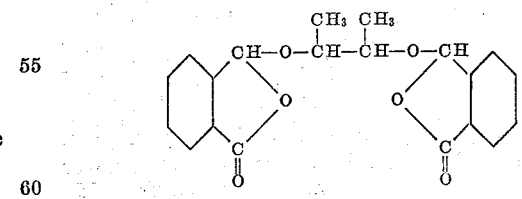

150 grams (1 mole) of phthalaldehydic acid and 45 grams (0.5 mole) of 2,3-butanediol were mixed and heated to 125° C. and maintained under reflux for one hour. The pressure on the system was reduced to about 15 millimeters and the mixture heated to 200° C. during the next hour to distill the water of reaction and to obtain as residue a crude reaction product. The latter partially solidified on cooling. It was reheated to 150° C. to melt the solid and then poured into 500 milliliters of water, whereupon a gummy solid precipitated. On warming on the steam bath, the amorphous solid crystallized. The crystals were filtered and dried to obtain the desired 3,3'-

(1,2-dimethyl-ethylenedioxy)diphthalide product melting from 165° to 175° C. in a yield of 161.5 grams or 91 percent of theoretical. The product was insoluble in most solvents. Infrared absorption spectra indicated the presence of an alkoxyphthalide with a small amount of open chain ester.

*Example 2.—3,3'-(methylenedioxy)diphthalide*

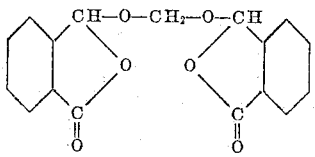

15 grams of polyoxymethylene (equivalent to 0.5 mole of formaldehyde) and 75 grams (0.5 mole) of phthalaldehydic acid were mixed and heated to 120° C. and maintained under reflux for three hours. The mixture was cooled and poured into 600 milliliters of water whereupon a semi-solid mass of a crude reaction product precipitated. Water was decanted from the precipitate and the latter washed and recrystallized from an acetone-water mixture to obtain a 3,3'-(methylenedioxy)diphthalide product as a solid melting from 130° to 134° C.

*Example 3.—3,3'-(tetramethylenedioxy)diphthalide*

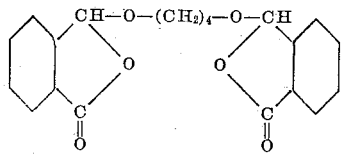

375 grams (2.5 moles) of phthalaldehydic acid and 112.3 grams (1.25 mole) of 1,4-butanediol were mixed and heated to 200° C. at about 15 millimeters pressure during a period of one hour. Some solid formed in the resulting mixture on cooling. The mixture was poured into 2 liters of water to obtain a solid precipitate of 3,3'-(tetramethylenedioxy)diphthalide product. The latter was recovered by filtration and dried at about 60° C. and 15 millimeters pressure in a vacuum oven. The dried product, melting from 86° to 91° C. and having a tan color, amounted to 439 grams or 99 percent of theoretical. The solid was then recrystallized from benzene to obtain a product melting at 86°–88° C.

*Example 4.—3,3'-(ethylenedioxy)diphthalide*

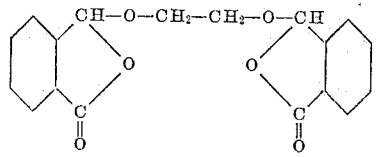

375 grams (2.5 moles) of phthalaldehydic acid and 77.5 grams (1.25 moles) of ethylene glycol were mixed and heated under 15 millimeters pressure to 145° C. over a period of one hour. The mixture was held in the temperature range of from 140° to 150° C. during the second hour and then raised to 210° C. during the next hour to remove the water of reaction and to obtain a 3,3'-(ethylenedioxy)diphthalide product in a yield of 400 grams or 98.5 percent of theoretical. The latter melted from 85° to 90° C.

*Example 5.—3,3'-(1,1-dimethylethylenedioxy)-diphthalide*

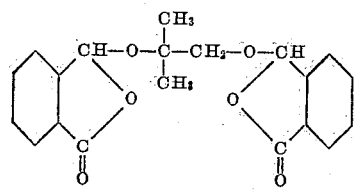

75 grams (0.5 mole) of phthalaldehydic acid and 22.5 grams (0.25 mole) of 2-methyl-1,2-propanediol were mixed and heated in the temperature range of from 115° to 125° C. for one hour. The pressure on the system was reduced to about 15 millimeters and the water removed while the temperature was raised to 130° C. At the end of this period the mixture was allowed to cool to obtain a 3,3'-(1,1-dimethylethylenedioxy)diphthalide product as a solid. The latter melted from 139° to 143° C. and amounted to 60 grams or a 68 percent yield.

*Example 6*

In similar preparations, the following diphthalides were obtained from the reaction of dihydroxy compounds with phthalaldehydric acid.

A 3,3'-(1-methyltrimethylenedioxy)diphthalide product, melting from 105° to 108° C., from the reaction of phthalaldehydic acid and 1,3-butanediol.

A 3,3'-(propylenedioxy)diphthalide product, having a refractive index $n_D^{60}$ of 1.5523, from the reaction of phthalaldehydic acid and 1,2-propanediol.

A 3,3' - (2,2 - dimethyltrimethylenedioxy)diphthalide product, having a refractive index $n_D^{60}$ of 1.5389, from the reaction of phthalaldehydic acid and 2,2-dimethyl-1,3-propanediol.

A 3,3' - (1 - isopropyl - 2,2 - dimethyltrimethylenedioxy) diphthalide product, melting from 52° to 57° C., from the reaction of phthalaldehydic acid and 2,2,4-trimethyl-1,3-pentanediol.

*Example 7*

93 grams (0.5 mole) of x-chlorophthalaldehydic acid (a phthalaldehydic acid containing a chlorine atom in the aromatic ring) and 16 grams (0.25 mole) of ethylene glycol were heated in the temperature range of 120° to 135° C. for 7 hours. At the end of this period the mixture was poured into 500 milliliters of a dilute sodium bicarbonate solution whereupon an oil precipitated. The aqueous solution was decanted therefrom and the remaining oil washed with water. The aqueous solutions were combined and extracted with benzene. The benzene extract was added to the oil and the mixture heated at about 15 millimeters pressure to remove the benzene and water by distillation and to obtain an oily residue. On standing, a small amount of solid anhydride by-product precipitated in the oil. The solid was removed by dissolving the oil in benzene and filtering to remove the solid. The filtrate was warmed to evaporate the benzene and to obtain a 3,3'-(ethylenedioxy)bis(x-chlorophthalide) product as residue. The product had a refractive index $n_D^{60}$ of 1.5700.

In similar preparations the following diphthalides may be prepared.

3,3'-(trimethylenedioxy)diphthalide by the reaction of phthalaldehydic acid with 1,3-propanediol.

3,3'-(hexamethylenedioxy)diphthalide by the reaction of phthalaldehydic acid with 1,6-hexanediol.

3,3'-(1-ethylethylenedioxy)diphthalide by the reaction of phthalaldehydic acid with 1,2-butanediol.

3,3'-(2-methyltrimethylenedioxy)diphthalide by the reaction of phthalaldehydic acid with 2-methyl-1,3-propanediol.

3,3'-(1,1-dimethyltrimethylenedioxy)diphthalide by the reaction of phthalaldehydic acid with 1,1-dimethyl-1,3-propanediol.

3,3' - (1,2 - dimethyltrimethylenedioxy)diphthalide by the reaction of phthalaldehydic acid with 1,2-dimethyl-1,3-propanediol.

3,3'-(1-isopropylethylenedioxy)diphthalide by the reaction of phthalaldehydic acid with 3-methyl-1,2-butanediol.

3,3' - (1 - isopropyl - 1,2,2 - trimethylethylenedioxy)-diphthalide by the reaction of phthalaldehydic acid with 2,3,4-trimethyl-2,3-pentanediol.

3,3'-(octamethylenedioxy)diphthalide by the reaction of phthalaldehydic acid with 1,8-octanediol.

3,3'-(1-butylethylenedioxy)diphthalide by the reaction of phthalaldehydic acid with 1,2-hexanediol.

3,3' - (1 - methyltrimethylenedioxy)bis(x-chlorophthalide) by the reaction of x-chlorophthalaldehydic acid with 1,3-butanediol.

3,3'-(propylenedioxy)bis(x-chlorophthalide) by the reaction of x-chlorophthalaldehydic acid with 1,2-propanediol.

3,3'-(pentamethylenedioxy)bis(x-chlorophthalide) by the reaction of x-chlorophthalaldehydic acid with 1,5-pentanediol.

The products of this invention are effective as germicides and may be employed for the control of bacterial organisms. In representative operation, a solid nutrient agar medium containing approximately 1 percent of 3,3'-(1,1-dimethylethylenedioxy)diphthalide was streaked with *Staphylococcus aureus* and incubated at 30° C. for three days. At the end of this period, complete inhibition of growth of the test organism was observed.

The phthalaldehydic acid employed in this invention may be prepared by first photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene is then heated with an aqueous solution containing from 4 to 35 percent by weight of a metal halide such as ferric chloride to obtain phthalaldehydic acid, as more fully disclosed and claimed in a copending application of James D. Head and Owen D. Ivins, Serial Number 279,682, filed March 31, 1952, now Patent No. 2,748,162.

The x-chlorophthalaldehydic acid employed in this invention may be prepared by first chlorinating o-xylene in the presence of ferric chloride in the temperature range of from 5° to 15° C. to obtain a ring-chlorinated, x-chloro-o-xylene. The ring-chlorinated product is then photochlorinated to obtain $\alpha,\alpha,\alpha,\alpha',\alpha'$-x-hexachloro-o-xylene and the latter hydrolyzed in a manner similar to that described above for phthalaldehydic acid.

We claim:
1. A diphthalide having the formula

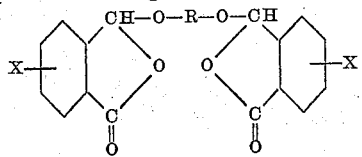

wherein R represents a member of the group consisting of methylene and an alkylene radical containing from 2 to 8 carbon atoms, inclusive, and X is a member of the group consisting of hydrogen and chlorine.
2. 3,3'-(methylenedioxy)diphthalide.
3. 3,3'-(tetramethylenedioxy)diphthalide.
4. 3,3'-(1,2-dimethylethylenedioxy)diphthalide.
5. 3,3'-(1,1-dimethylethylenedioxy)diphthalide.
6. 3,3'-(ethylenedioxy)diphthalide.
7. A method for preparing a diphthalide having the formula

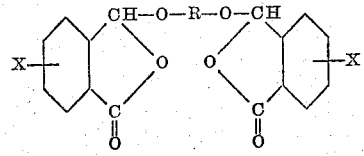

wherein R represents a member of the group consisting of methylene and an alkylene radical containing from 2 to 8 carbon atoms, inclusive, and X is a member of the group consisting of hydrogen and chlorine which comprises the step of heating phthalaldehydic acid and a dihydroxy compound having the formula

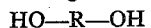

HO—R—OH wherein R is as above defined at a temperature of from 90° to 225° C. at a pressure of from 15 millimeters to 760 millimeters for a time sufficient to allow completion of the reaction.

8. A method according to claim 7 wherein two molar proportions of phthalaldehydic acid and one molar proportion of a dihydroxy compound are employed.

No references cited.